(12) United States Patent
Fredenhagen et al.

(10) Patent No.: US 8,349,054 B2
(45) Date of Patent: Jan. 8, 2013

(54) ADSORPTION DRYING APPARATUS AND ADSORPTION DRYING METHOD

(75) Inventors: Andreas Fredenhagen, Coburg (DE); René Martin, Coburg (DE); Michael Feisthauer, Meeder (DE); Michael Rohdenburg, Lautertal (DE)

(73) Assignee: Kaeser Kompressoren AG, Coburg (DE)

( * ) Notice: Subject to any disclaimer, the term of this patent is extended or adjusted under 35 U.S.C. 154(b) by 237 days.

(21) Appl. No.: 12/957,468

(22) Filed: Dec. 1, 2010

(65) Prior Publication Data
US 2011/0132191 A1 Jun. 9, 2011

(30) Foreign Application Priority Data
Dec. 3, 2009 (EP) .................................... 09177948

(51) Int. Cl.
 *B01D 53/06* (2006.01)
 *B01D 53/26* (2006.01)
(52) U.S. Cl. .................. 95/125; 95/130; 96/19; 96/113; 96/122
(58) Field of Classification Search .................. 96/113, 96/125, 130, 144; 95/14, 19, 22, 113, 121–125; 34/80
See application file for complete search history.

(56) References Cited

U.S. PATENT DOCUMENTS

| | | | |
|---|---|---|---|
| 2,675,089 A | 4/1954 | Kahle | |
| 4,062,129 A | 12/1977 | Yoshida et al. | |
| 4,235,608 A | 11/1980 | Watanabe et al. | |
| 4,701,189 A | 10/1987 | Oliker | |
| 5,385,603 A * | 1/1995 | Sienack | 96/125 |
| 5,667,560 A * | 9/1997 | Dunne | 95/113 |
| 7,166,149 B2 * | 1/2007 | Dunne et al. | 95/113 |
| 7,789,942 B2 * | 9/2010 | Vanderstraeten et al. | 95/113 |

FOREIGN PATENT DOCUMENTS

| | | |
|---|---|---|
| CH | 691 349 A5 | 7/2001 |
| DE | 39 02 977 A1 | 8/1989 |

OTHER PUBLICATIONS

EP Search Report issued on Feb. 17, 2010 in EP Application No. 09177948.

* cited by examiner

*Primary Examiner* — Frank Lawrence, Jr.
(74) *Attorney, Agent, or Firm* — Panitch Schwarze Belisario & Nadel LLP (57) ABSTRACT

An adsorption drying apparatus, in particular for drying a compressed gas, includes an adsorption chamber (11) having a plurality of adsorption conduits (101) containing an adsorption material (123), a first feeding line (106) and a first discharging line (109) disposed at a first end (111) of the adsorption chamber (11), and a second feeding line (108) and a second discharging line (107) disposed at a second end (112) of the adsorption chamber (11). The adsorption chamber (11) is rotatable with respect to the feeding and discharging lines (106, 107, 108, 109) so that the adsorption conduits may be fluidically connected in temporal alternation, wherein the gas is dried in a drying sector (102), and the adsorption material (123) is regenerated in the regeneration sector (103). The first feeding line (106) is configured such that the gas stream to be dried may be fed to the regeneration sector (103) as a full flow.

20 Claims, 5 Drawing Sheets

ADSORPTION DRYING APPARATUS AND ADSORPTION DRYING METHOD

BACKGROUND OF THE INVENTION

The invention relates to an adsorption drying apparatus as well as an adsorption drying method, particularly for drying compressed gases.

For drying gases, adsorption methods are frequently used. The dehumidification of compressed air, nitrogen, natural gas or gases from chemical production processes should be mentioned by way of example. Apart from methods using two or more separate adsorption containers which run through a drying cycle and a regeneration cycle in mutual alternation, there are methods working on a rotating adsorbent, in which the adsorbent is fixed within a drum and continuously moved through a sector in which it is regenerated (regeneration sector), and a sector in which it is used for drying (drying sector). On the front sides of the adsorbent, chambers are present through which the various gas flows are passed through the sectors. The sectors are each formed by the parts of a drum situated in the zones defined by the chambers so that each part of the drum is cyclically moved through the sectors.

These methods are often used in air conditioning technology but are also known in compressed air technology. Only by way of example, reference is made in this context to German patent publications DE 1 751 041 and DE 2 238 551. The method according to DE 1 751 041, which is also referred to as a partial stream process, will be explained below on the basis of FIG. 1.

Figure 1:
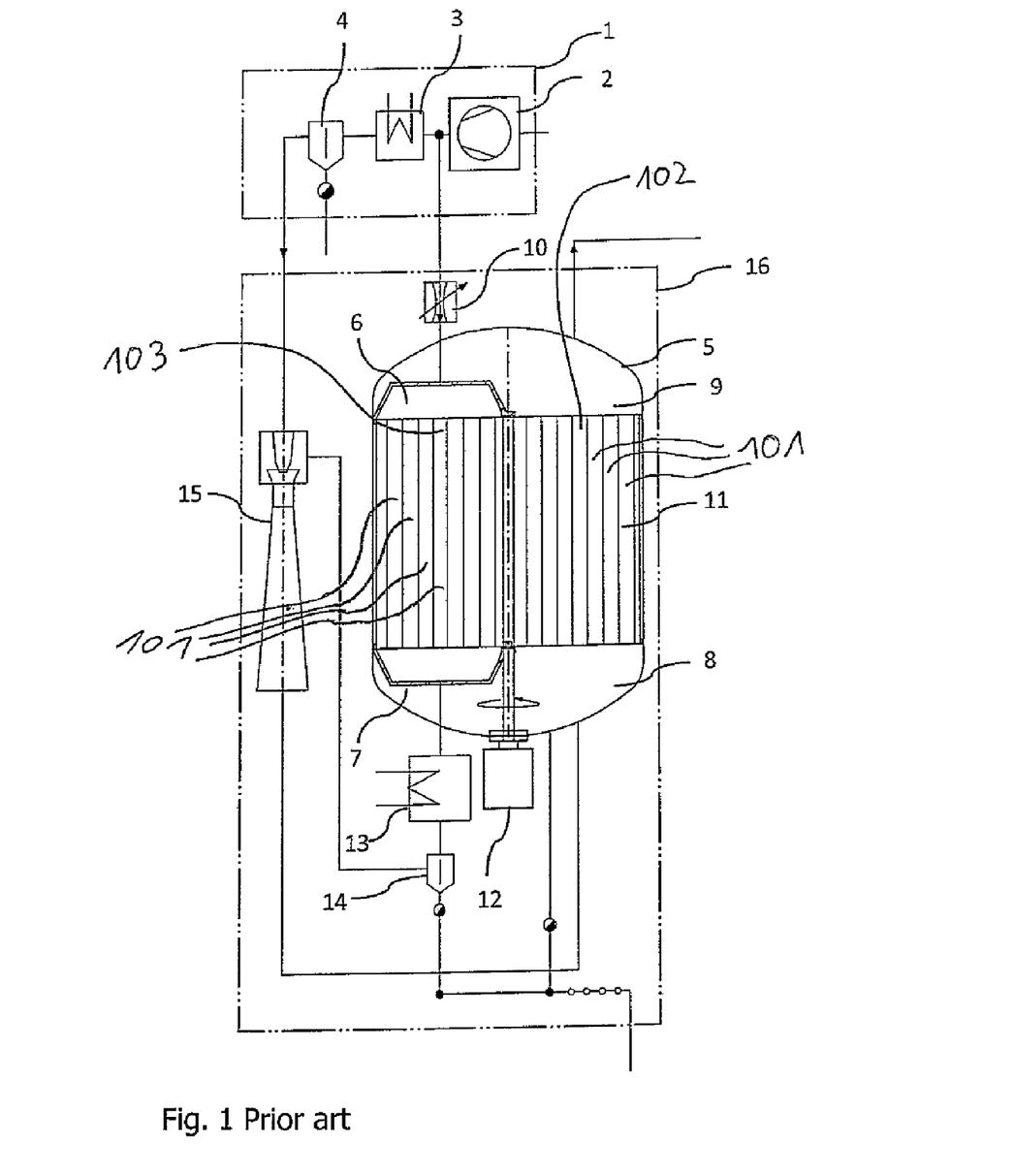
FIG. 1 is a schematic representation of an adsorption drying apparatus according to the prior art.

The drying apparatus is in this case configured as a rotatable, drum-like chamber 11 having a plurality of parallel adsorption conduits 101, wherein the adsorption chamber 11 can be moved, preferably continuously, through a drying sector 102 and a regeneration sector 103 using a chamber drive 12.

Part of the gas compressed in a compressor block 2 (a highest stage) of an input compressor 1 is immediately conducted to a regeneration inlet chamber 6 in a drying unit 16, flows then through the regeneration sector 103 of the adsorption chamber 11 to a regeneration outlet chamber 7 while absorbing humidity. The gas stream exiting the regeneration sector 103 is cooled downstream in a regeneration cooler 13 with condensed liquid being precipitated in a separator 14. A main stream is cooled in a secondary cooler 3 of the input compressor 1 with humidity being precipitated in a condensate separator 4.

The main stream and the stream exiting the regeneration sector 103 are unified and conducted into a drying inlet chamber 8. The reunification of the stream exiting the regeneration sector 103 and the main stream is realized according to the prior art by an ejector 15 through which the regeneration stream is sucked in and compressed by the main stream. Since the main stream and hence the reunified stream as well experience a considerable pressure loss due to the secondary cooler 3 and in particular the ejector 15, the regeneration stream is throttled down by a throttle valve 10, prior to entering the adsorption chamber 11 and regeneration chamber 6, to such a degree that a differential pressure between the regeneration inlet chamber 6 and the drying outlet chamber 9 adopts an at least low positive value.

The method according to the prior art is found to be disadvantageous. As a result of the compression in the input compressor, the gas is heated. However, only a minor part of the heat is available for the regenerating, since only the mentioned partial stream is conducted through the regeneration sector. In general, the regeneration capacity within the drying sector is often not sufficient, in particular when larger amounts of humidity have to be adsorbed in the adsorption chamber 11 due to low pressures or high temperatures of cooling media of the heat exchangers used (secondary cooler 3 and regeneration cooler 13). The adsorption chamber 11 is then overloaded and high humidity concentrations occur at the outlet of the adsorption chamber 11. In sum, the method according to the prior art offers a comparatively low operational safety as far as unfavorable conditions are concerned.

Moreover, the ejector 15 is of a comparatively low energy-efficiency. In particular, when a high regeneration flow has to be achieved, a comparatively high pressure loss of the main stream is required to suck in the regeneration stream. The input compressor 1 must then have a correspondingly increased performance so as to secure the required output pressure.

According to the prior art, the ejector 15 is designed for one operating point and is not further regulated. At deviating operating pressures and volume flows, more unfavorable regeneration stream proportions occur.

In particular, when the relative humidity of the gas to be dried amounts to 100%, non-separated drops may be contained. When such drops impact an adsorption material in the adsorption chamber 11, sudden heat developments and material damages arise. The lifetime of the adsorption material is thus comparatively limited.

Methods are known from International patent application publication WO 2005/070518 A1, German patent publication DE 2 311 813 and European Patent EP 1 283 741 B1, in which the compression heat is utilized largely completely by corresponding input compressors by passing essentially the entire gas stream from the input compressor 1 through the respective regeneration sectors. A problem in this case is that a leakage stream occurs as a part of the humid regeneration stream from the regeneration inlet chamber 6 and the regeneration outlet chamber 7 into the drying outlet chamber 9 and/or drying inlet chamber 8, which exhibit lower pressures in the known methods. In the apparatus described in WO 2005/070518 A1, this is prevented by seals ("bulb seals"). During rotation, such seals are exposed to high loads leading to rapid wear and therefore costs. If the seals ("bulb seals") do not seal entirely, a leakage stream has to be expected all the same. The apparatuses described in DE 2 311 813 and EP 1 283 741 take another approach and try to prevent a contamination of the stream entering into and/or exiting from the drying sector 102 by providing interspaces in which an even lower pressure prevails due to suction. The realization of the latter method is comparatively laborious, with the comparatively high differential pressures within the adsorption chamber putting extremely high demands on the sealing at a drum surface of the adsorption chamber and the mechanical stability of a material from which the adsorption chamber is made. Especially, a high differential pressure between a regeneration zone and the interspace suction involves the risk of high leakage streams which can strongly affect the efficiency of the method.

Furthermore, reference should be made at this point to International patent application publication WO 00/74819 A1, which likewise proposes an adsorption drying method, in which only a partial stream of the gas to be dried is fed to a regeneration sector. Since the regeneration stream, as compared to the non-branched off main stream, experiences a distinct pressure loss after passing through the regeneration sector and a cooler, a fan 48 is provided to enable a reunification of the partial regeneration stream and the main stream. According to the prior art, the fan 48 is hence only necessary because a partial stream is branched off from the main stream and passes separately through the regeneration sector.

In summary, the prior art may be classified into two groups of adsorption facilities and methods. In a first group, only a partial stream is used for regeneration, which reduces the efficiency for the reasons explained above. In a second group, the entire stream is used for regeneration, which, however, either leads to a leakage and hence a lower drying degree that can be achieved, or involves a comparatively high constructional expenditure.

BRIEF SUMMARY OF THE INVENTION

It is therefore an object of the invention to provide an adsorption drying apparatus and an adsorption drying method which work as efficiently as possible, wherein the achievable drying degree should be high and the constructional expenditure at the same time low. In particular, the advantages of a rotating adsorption chamber should be utilized, and at the same time a high regeneration capacity and hence operating safety should be achieved without the disadvantages caused by differential pressures within the adsorption drying apparatus.

The object is achieved, in particular, by an adsorption drying apparatus, particularly for drying a compressed gas, comprising an adsorption chamber having a plurality of adsorption conduits containing an adsorption material, wherein at a first end of the adsorption chamber a first feeding line and a first discharging line are disposed, and at a second end of the adsorption chamber a second feeding line and a second discharging line are disposed. The adsorption chamber is rotatable with respect to the feeding and discharging lines, so that the adsorption conduits may be fluidically connected in temporal alternation with the first feeding line and the second discharging line or the first discharging line and the second feeding line. A drying sector as well as a regeneration sector are defined, wherein the gas is dried in the drying sector, and the adsorption material is regenerated in the regeneration sector. The first feeding line is configured such that the gas stream to be dried may be fed to the regeneration sector as a full flow, while the second discharging line is in communication with the second feeding line and thus forms a connecting line in which a condenser is provided. A pressure increasing device is provided within the connecting line downstream of the condenser, so as to increase the pressure of the gas flowing from the second discharging line to the second feeding line. A cooling stream may be branched off at the first and/or second end of the adsorption chamber, as need be, so as to cool the adsorption chamber within the cooling sector. The regeneration sector and the drying sector are connected in cascade for a serial through-flow, such that the gas stream fed to the drying sector essentially completely corresponds to the gas stream discharged from the regeneration sector, where appropriate, including the gas stream from the cooling sector. An input compressor may be provided for feeding the gas to be dried in a compressed state to the first feeding line.

The term "line," in particular feeding line, discharging line, connecting line, should be understood hereinafter in terms of function as a corresponding feed, drain or connector. The term "line" may alternatively also be understood restrictively in the sense of a physical delimitation. Under "temporal alternation" should be understood in general that the adsorption conduits, on the one hand, can be set in communication with the first feeding line and the second discharging line and, on the other hand, with the first discharging line and the second feeding line. This, however, should generally not imply that the adsorption conduits cannot be connected to yet other lines or gas ducts.

Here, a condenser is understood as the functional unit (where appropriate, also the structural unit) of a cooler and a condensate separator, with at least a part of the condensable component being condensed out in the cooler and separated thereafter in the condensate separator.

A full flow should, in particular, be understood as a portion of the gas stream of at least 95%, preferably at least 99%, more preferably (essentially) 100%.

A core idea is that the first feeding line is configured such that the gas stream to be dried can be fed to the regeneration sector as a full flow, with the second discharging line being in communication with the second feeding line and hence forming a connecting line in which a condenser is provided. A pressure-increasing device is provided in the connecting line in order to increase the pressure of the gas flowing from the second discharging line to the second feeding line. A cooling stream can be branched off at the first or second end of the adsorption chamber, as need be, for cooling the adsorption chamber within a cooling sector. The regeneration sector and the drying sector are connected in cascade for a serial through-flow, in such a manner that the gas stream fed to the drying sector essentially completely corresponds to the gas stream discharged from the regeneration sector, where appropriate including the gas stream from the cooling sector. In principle, there is no dividing of the gas stream into a main stream and a regeneration stream with the related disadvantages. Moreover, the pressure-increasing device is provided on the one hand, which prevents the formation of an undesired leakage stream in a simple manner. The heat resulting from the compression in the input compressor may in particular be used efficiently for the regeneration of the adsorbent in the adsorption chamber. The method is then particularly efficient when the input compressor is a screw-type compressor and/or turbo compressor.

In the proposed adsorption drying apparatus, the pressure-increasing device generates a positive differential pressure between the drying and regeneration sectors in order to prevent air from passing from the regeneration sector into the drying sector. The purpose of the pressure-increasing device hence is to compensate for the pressure loss of the gas from the regeneration inlet chamber to the drying outlet chamber via the regeneration sector, the condenser, the drying sector as well as the corresponding connecting lines to the chamber and, in addition, to build up the positive differential pressure mentioned above.

Silica gel or, alternatively, a molecular sieve, for instance, can be used as the adsorption material. The rotational frequency of the adsorption chamber may be, for example, 2 to 20 revolutions per hour.

The second feeding line in particular is meant to be the respective open inlet cross-section into the adsorption chamber. The term connecting line should be understood in general as a functional connection but can also be understood in a restricting way.

Due to the fact that the adsorption chamber is rotatable, the apparatus according to the invention, as compared to an adsorption apparatus having two or more separate adsorption containers in which compression heat possibly is likewise used for the regeneration, has the advantage that only one adsorption container is required, and a complex tubing having a multitude of valves and a corresponding control is not needed either.

A further advantage of the invention is that the gas stream temperature is raised by the pressure-increasing device. This lowers the relative humidity of the gas so that water drops, which might be still present, evaporate. Damage to the adsorption material may thus be prevented or reduced so that comparatively long lifetimes can be achieved, particularly as compared to the partial stream method.

The term "drying" may be understood in a restricting way to the extent that water has to be removed from an air stream or gas stream. In general, however, "drying" should be understood as the removal of an adsorbable and/or condensable component from an air stream or gas stream.

An adsorption chamber or "drying drum," as generally usual and known in air conditioning technology or compressed air drying in the partial stream method, can be used (e.g., see U.S. Pat. No. 4,391,667).

Preferably, the drying drum, for example, is made of a thin carrier material of plane and corrugated foils, which defines a structure of preferably parallel conduits and onto which an adsorbent, e.g. silica gel, is fixed which is chemically bound, for example. Depending on the size of the drying drum, metal sheets (spokes) can be fixed around an axis of rotation which extend from the inside radially outwardly along the axis of rotation (drum axis). A comparatively high stability of the drying drum is thus achieved. In the segments which are created by forming of the spokes, blocks having the conduit structures described above can be fixed. Also, two or more blocks or rows of blocks may be arranged one behind the other, so that drying drums of a greater length may be provided or the length of the drying drum varied, which increases the efficiency of the drying process.

Preferably, the conduits are formed to be smaller than the edges of the corresponding zones, so that an adsorption conduit cannot be in concurrent communication with two zones delimited by the edges.

The adsorption chamber can be supported to be rotatable within an adsorption container, which preferably also comprises at least in part the feeding and discharging lines. Such feeding and discharging lines are simple to manufacture and robust.

The pressure-increasing device is preferably provided at least in part within the adsorption container, in particular at least in part within a support for the rotatable adsorption chamber. This enables further tubing to be saved, which reduces the costs with respect to construction. The pressure-increasing device can preferably be arranged on or fixed to the bottom of the adsorption container.

The pressure-increasing device may be a mechanical compressor, in particular a compressor and/or a fan and/or a pump and/or a side-channel compressor and/or a turbo compressor, e.g. a radial compressor. Side-channel compressors are generally used for processes using atmospheric suction pressure in order to achieve relatively low pressure increases. In the present case, however, it has surprisingly been shown that side-channel compressors can also be advantageously used for performing the required pressure increases in the adsorption drying apparatus at high suction pressures. In radial compressors, the compressor casing (e.g. a spiral casing) is likewise only designed for low overpressures. When the compressor casing is preferably configured to be pressure-resistant and an outlet of the compressor casing is in particular set in communication with the inlet of the drying chamber, a radial compressor can be integrated in a simple manner without the need for complicated adaptations of the adsorption drying apparatus.

The connecting line can be made such that, when the adsorption drying apparatus is in operation, a gas stream flowing out of the second discharging line is essentially equal to a gas stream flowing into the second feeding line. This is intended to mean in particular that neither a considerable part of the gas stream flowing out of the second discharging line is separated, nor is a line provided for feeding a further gas stream to the connecting line. In that sense, the connecting line correspondingly does not have any branches. This facilitates the controlling of the adsorption apparatus and the structure thereof.

An input compressor is preferably provided for feeding the gas to be dried in a compressed state to the first feeding line. The input compressor may be a one-stage or multi-stage, dry-compressing screw-type compressor and/or a turbo compressor. The heat developing during compression may then be utilized in a particularly simple manner for regenerating the adsorbent. The input compressor preferably comprises a compressor condenser having in particular a secondary cooler and a condensate separator, wherein more preferably the compressor condenser, in particular the secondary cooler and/or the condensate separator, form(s) at least in part the condenser provided in the connecting line. This enables a component of the adsorption apparatus to be omitted at least in part, which reduces costs and in particular decreases maintenance and mounting expenditures.

In a specific embodiment, a first cross-sectional area $Q_1$ of the first feeding line adjacent to the adsorption chamber and defining a regeneration sector is smaller than a second cross-sectional area $Q_2$ of the second feeding line adjacent to the adsorption chamber and defining a drying sector, with a ratio $Q_2/Q_1$ being in a range of 0.3-3, preferably being approximately equal.

In specific embodiments, the cross-sectional area $Q_1$ is smaller than a third cross-sectional area $Q_3$ of the second discharging line adjacent to the adsorption chamber, with $Q_1/Q_3$ being preferably more than 0.9, hence being in a range of between 0.9 and 1.0. Alternatively or in addition, the cross-sectional area $Q_2$ can be smaller than a fourth cross-sectional area $Q_4$ of the first discharging line adjacent to the adsorption chamber. As a result, the adsorption chamber can be cooled within a cooling sector. The efficiency of the adsorption apparatus is thus improved in a particularly simple manner.

The dimensioning of the cross-sectional areas $Q_1$ and $Q_3$ is preferably performed such that a pressure difference across the cooling sector, at which the required cooling-air flow flows through the cooling sector, is higher than the pressure difference across the regeneration sector by a comparatively low amount (e.g. 1 to 4 millibar). If the cooling sector is selected to be too large in relation to the regeneration sector, a higher pressure arises in the cooling-air flow required for cooling in the regeneration chamber than in the drying chamber 1, which would deteriorate the drying result or lead to an unnecessarily high delivery volume being delivered through the pressure-increasing device, so that a sufficiently high pressure difference builds up based on the now increased cooling-air flow flowing across the cooling sector. The ratio of the cross-sectional areas $Q_1/Q_3$ is therefore preferably >0.90, in particular >0.95.

In a further specific embodiment, a cooling stream can be branched off at the first or second end of the adsorption chamber for cooling the adsorption chamber within a cooling sector. This enables the cooling to be controlled independently of the stream of the gas to be dried. This improves the operational safety with respect to variable volume flows.

In particular, when a radial compressor is provided, the pressure-increasing device may comprise a ring diffuser. A spiral casing can then be renounced, for example, while advantage can be taken of the fact that, due to the process design, the compressed air flows into the drying sector via a comparatively large cross-section and therefore there is no need for the air (gas) exiting at a compressor wheel circumference of the radial compressor to be united in a tube cross-section.

Preferably, the ring diffuser is at least in part formed by the adsorption container, in particular the support. Material for forming the ring diffuser may thus be saved, which reduces costs.

Preferably, a drive shaft for driving the pressure-increasing device is guided at least in part in a line section of the connecting line. It applies in general that, when a drive shaft is provided for driving the pressure-increasing device, the radial forces acting upon the shaft are minimized by the ring diffuser, which has a positive effect on the bearing and feedthrough of the drive shaft. A feedthrough of the drive shaft through a line section of the connecting line is particularly simple in terms of structural engineering.

In a specific embodiment, a line section of the connecting line, in particular the line section mentioned above, presents at least one gas inlet opening formed in a connecting line wall. The air to be dried can then be supplied in a particularly simple manner.

A drive unit for driving the pressure-increasing device is preferably disposed outside a pressure space, in particular outside a compressor casing and/or outside the adsorption container. This allows the corresponding drive shaft to be guided from the pressure space to the exterior drive unit. Moreover, this has the consequence that lubricants cannot reach the compressed air via the pressure-increasing device, which is particularly advantageous in drying after dry-running compressors. A dry-running compressor can be used to prevent contaminations, in particular hydrocarbons from being contained in the compressed air.

Preferably, the shaft of a compressor wheel is unilaterally supported, in particular outside the pressure space, preferably outside a compressor casing and/or outside the adsorption container. As a consequence, bearing lubricants do not have any direct contact with the gas to be dried, and in general the drive shaft is supported outside the pressure space.

In possible specific embodiments, a seal is provided for sealing the shaft, in particular a throttle slit seal and/or a labyrinth seal and/or in particular a dry-running lip seal and/or at least a seal which is expandable, and/or at least a seal which seals at a standstill of the shaft and/or a gas-lubricated or liquid-lubricated slip ring seal, with the seal more preferably being accessible from outside the pressure space, in particular from outside the compressor casing and/or adsorption container. Particularly in the case of expandable seals, these can be adapted such that they contact the shaft only at standstill, which minimizes leakage losses even during a comparatively long standstill of the adsorption drying apparatus. In general, an additional sealing can thus be achieved during a standstill of the adsorption drying apparatus.

Accessibility of the seal from outside the compressor casing or adsorption container shall mean in particular that the seal is accessible or can be replaced without removing the adsorption chamber.

An (additional) seal may be provided which establishes a contact-seal upon standstill of the shaft. Leakage losses during standstill of the shaft are thereby minimized. For instance, one or more expandable seals (example: inflatable O-ring seals) can be provided and/or seals which rest on a sealing surface during standstill and move away from the sealing surface, due to a deformation caused by the centrifugal force, during rotation of the shaft (example: lip seal).

The seal in the adsorption drying apparatus is preferably mounted in such a manner that a replacement of the seal is possible without opening the entire adsorption chamber cross-section (or a part thereof), demounting the chambers (in particular the regeneration inlet chamber, regeneration chamber, drying inlet chamber and drying outlet chamber), or removing the adsorption chamber and/or a drum bearing.

For this purpose, the shaft may be divided such that a detachment of the shaft connection is possible from outside the adsorption container. As an alternative or in addition, the connection between the compressor wheel and the shaft may be configured such that a detachment is possible from outside the adsorption container. As an alternative or in addition, a container bottom may be configured such that a withdrawal of the compressor wheel is possible. A further alternative is to use (insert) a seal having split sealing rings which is accessible from outside.

In a possible embodiment, a drive unit for driving the pressure increasing device is arranged within the pressure space, in particular within the compressor casing and/or adsorption container. Operation of the pressure-increasing device may thus be enabled without or at only slight leakage loss.

In a possible embodiment, a magnetic clutch is provided for driving the pressure-increasing device. Here as well, operation of the pressure-increasing device is in particular enabled without or at only slight leakage loss. Furthermore, a feedthrough for a rotary shaft into the casing of the pressure-increasing device or the adsorption container is not necessary.

In further alternatives, the drive gear and/or the drive shaft of the pressure-increasing device is/are supported to be gas-lubricated and/or dry-running. As an alternative or in addition, a magnetic bearing may be provided as a support and/or a roller bearing in which, for example, a throttling line can establish a negative pressure in a bearing area. As a result, contaminations of the gas to be dried are thus avoided or at least reduced.

Preferably, a controller is provided for controlling the speed of the pressure-increasing device, e.g. via frequency conversion. The frequency conversion preferably can be controlled via a signal from the input compressor, e.g. via the speed of the input compressor and/or via a pressure within the input compressor and/or the adsorption drying apparatus. Such a controller or measuring devices increase(s) the efficiency of the adsorption drying apparatus.

Preferably, parameters can be referred to which are already existing and/or stored in the compressor control. The controller is preferably configured so as to evaluate at least one parameter of the pressure-increasing device, in particular the speed of the input compressor and/or the pressure within the input compressor and/or the pressure within the adsorption drying apparatus, and to correspondingly control the speed of the pressure-increasing device. As an alternative or complement, the parameter of the pressure-increasing device can be obtained by a measuring device provided for this purpose.

The object mentioned above is independently achieved by an adsorption drying system, optionally including an adsorption drying apparatus of the type described above, but also independently of an adsorption drying apparatus of the type described above, wherein an input compressor is provided for compressing the gas to be dried, and wherein the compressed gas to be dried can be fed from the input compressor to the first feeding line as a full flow. In this case, the input compressor preferably comprises a compressor condenser having in particular a secondary cooler and a condensate separator, wherein more preferably the compressor condenser, in particular the secondary cooler and/or the condensate separator form(s) at least in part the condenser provided in a connecting line. The adsorption drying system essentially presents the same advantages as the adsorption drying apparatus described above.

The controller for the adsorption drying apparatus can be implemented in the adsorption drying apparatus itself. The controller is preferentially implemented in the input compressor control, which itself is preferentially arranged in or at the input compressor. Of course, it is also possible to provide for the controller of the adsorption drying apparatus to be partially or completely external, e.g. to cooperate with an external central controller.

The object mentioned above is achieved by an adsorption drying method, in particular for drying a compressed gas, comprising the steps of:
   a) providing an adsorption chamber having a plurality of adsorption conduits;
   b) conducting the gas to be dried in a full flow principle from a first end to a second end of the adsorption chamber through a regeneration sector;
   c) increasing the pressure of the gas after conducting it through the regeneration sector;
   d) conducting the gas from the second end to the first end of the adsorption chamber through a drying sector; and
   e) rotating the adsorption chamber.

In general, steps a) to e) are not performed in a certain temporal order. Step e) in particular can be performed continuously. The order of steps b) to d) can be related to the gas stream to be dried which is subjected to the process. The adsorption method essentially exhibits the same advantages as the adsorption drying method described above.

The amount of gas fed to the drying sector in step d) can correspond to 105% to 115%, such as 110% of the amount of gas discharged from the regeneration sector in step b). Between steps b) and d), the liquid in particular condensed from the gas by cooling is separated from the gas by condensate separation.

In a possible configuration of the method, a portion of the gas, preferably 5-10%, more preferably 7-15%, in particular about 10%, is conducted from the first to the second end of the adsorption chamber through a cooling sector after step d).

Preferably, the gas stream from the regeneration sector, optionally including the gas stream from the cooling sector, corresponds to at least 90%, 95%, (essentially) completely to the gas stream which is fed to the drying sector.

In a specific embodiment of the method, a drive unit for increasing the pressure in step c) is operated at a constant speed. The adjustment of the speed can then be performed for an intended maximum volume flow which can result from a volume flow of a compressed air and, for instance, a cooling-air flow. Such a method is particularly simple with respect to controlling.

As an alternative, the drive unit for increasing the pressure in step c) can be operated at a variable speed. The intake volume flow of the input compressor, or more precisely the air mass flow entering the adsorption drying apparatus, as well as the intake density are decisive for the speed of the pressure-increasing device. In this case, the speed may in particular be evaluated by one or more of the following parameters:
   intake volume flow of an input compressor (quantity delivered);
   speed of the input compressor;
   air flow emitted into the pressure-increasing device;
   intake density of the pressure-increasing device;
   inlet pressure in the pressure-increasing device;
   inlet temperature in the pressure-increasing device;
   suction pressure or ambient pressure of the input compressor;
   suction temperature of the input compressor;
   differential pressure between a first end of the drying sector and a second end of the regeneration sector.

As a result, the method can be performed in a particularly efficient manner. The speed of the input compressor and the inlet pressure into the pressure-increasing device will in general have the strongest influence on an intake volume flow of the pressure-increasing device. Instead of the mentioned parameters, other values can also be measured alternatively which are in close correlation to the indicated values, for example the outlet pressure of the pressure-increasing device in place of the inlet pressure. When a differential pressure between the drying outlet chamber and the regeneration inlet chamber is kept at a low but positive value (e.g. 1 to 4 millibar), this will have the consequence, on the one hand, that the pressure increase by the pressure-increasing device is sufficient so that a leakage of humid air to dry air cannot take place and, on the other hand, that a minimum pressure difference exists across a possibly provided cooling-air zone and thus an adsorbent cooling takes place. Hence, it is possible to use this differential pressure alone as a regulating variable and to maintain it at a constant value by adjusting a speed of the pressure-increasing device.

To the extent that there is no very low ambient humidity, a change of an operating volume flow, as a rule, also entails a change in the introduced amount of humidity. An optimum speed of the adsorption chamber is thereby changed as well, which can be adjusted correspondingly. The operating volume flow, on the one hand, which is determined in a manner similar to the determination of the speed of the pressure-increasing device, and the temperatures at the first or second ends of the regeneration sector, on the other hand, are important for the optimum speed of the adsorption chamber. Parameters correlating with the parameters mentioned above may be taken into account.

Preferably, the rotation in step c) is started only when a predefined temperature threshold of the gas and/or a component of an adsorption drying apparatus used is exceeded. When, for example, the input compressor does not deliver any compressed air into the adsorption chamber, this is stopped and only restarted at a renewed delivery. At the start or after a prolonged standstill of the adsorption chamber or adsorption drying apparatus, the adsorbent, which is located in the regeneration sector at this point of time, may be cold. Moreover, the input compressor also delivers first a gas of a lower temperature. For this reason, it is advantageous to start the rotation of the adsorption chamber only when a sufficient heating is ensured. This can be monitored by corresponding temperature sensors.

An axis of rotation of the adsorption chamber preferably can be vertically oriented. The inlet into the regeneration sector of the gas to be dried can take place from above. The inlet into the drying sector of the gas to be dried can take place from below. In general, however, the relationships may be just the other way round. A horizontal or other orientation of the axis of rotation of the adsorption chamber is conceivable. If an inlet of the gas to be dried into the regeneration sector is intended from below, measures will preferably be provided in a then upper zone for discharging the condensate forming upon cooling at a standstill.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

The same reference numerals are used in the following description for like parts and parts of like action.

DETAILED DESCRIPTION OF THE INVENTION

The adsorption drying apparatus according to FIG. 1 (prior art) was already described above.

Figure 2:
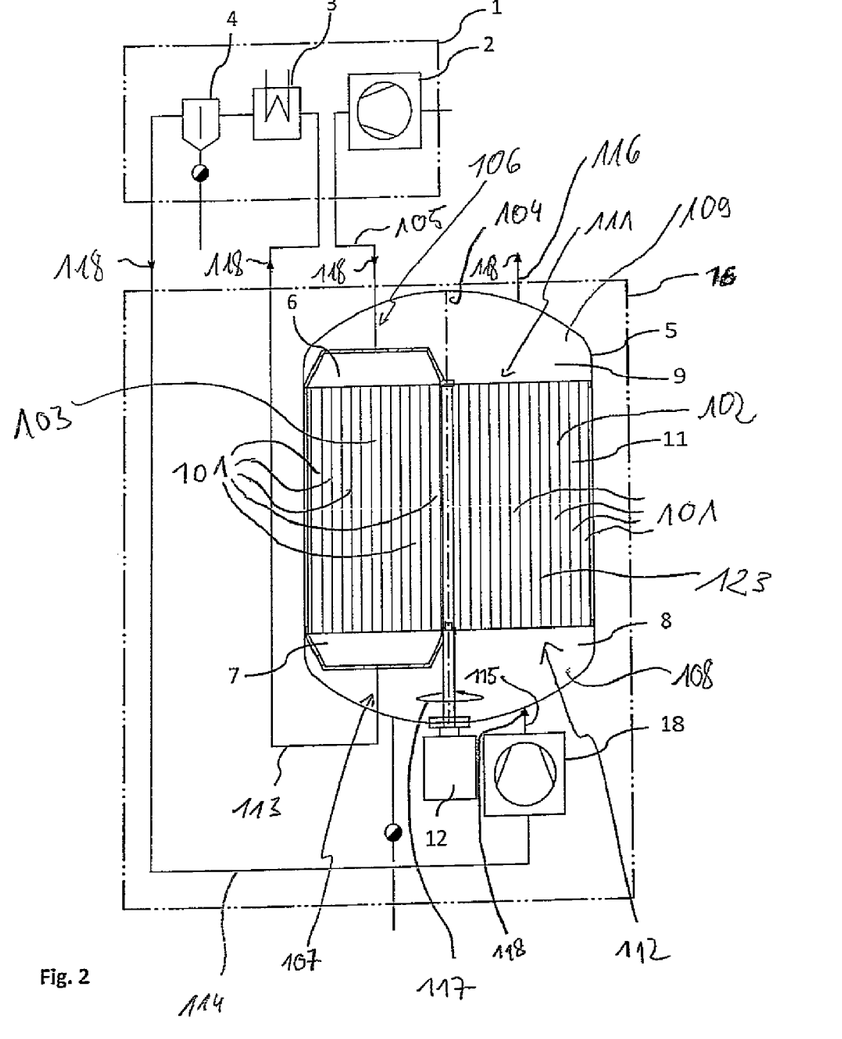
FIG. 2 is a schematic representation of an adsorption drying apparatus according to an embodiment of the invention.

FIG. 2 shows an adsorption drying apparatus according to an embodiment of the invention in a schematic representation. An adsorption material 123 is located in an adsorption chamber 11 supported within an adsorption container 5 to be rotatable about an axis of rotation 104. The adsorption chamber 11 comprises a plurality of preferably parallel adsorption conduits 101 through which the gas to be dried can be conducted.

Via a line 105 the gas to be dried, which was compressed in a compressor block 2 of the input compressor 1, can be fed to a regeneration inlet chamber 6, which forms at least in part a first feeding line 106. The regeneration inlet chamber 6 and the first feeding line 106 are arranged at a first end 111 of the adsorption chamber 11. In this case, the entire gas stream exiting the compressor block 2 is conducted to the regeneration inlet chamber 6 via the line 105.

In operation, the gas stream flows from the regeneration chamber 6 through the plurality of adsorption conduits 101 to a regeneration outlet chamber 7, while taking up humidity from the adsorption chamber 11 within a regeneration sector 103. The regeneration outlet chamber 7 forms at least in part a second discharging line 107. The regeneration outlet chamber 7 and the second discharging line 107 are arranged at a second end 112 of the adsorption chamber 11.

The gas stream exiting the regeneration sector 103 can be fed to a secondary cooler 3 as well as a condensate separator 4 of the input compressor 1 via a line 113. In the condensate separator 4 humidity is extracted from the gas stream.

The gas stream exiting the condensate separator 4 is fed to a pressure-increasing device 18, specifically a fan, via a line 114. In the pressure-increasing device 18, the pressure of the gas stream to be dried is raised.

Via a line 115 a gas stream of an increased pressure exiting the pressure-increasing device 18 is fed to a drying inlet chamber 8, which forms at least in part a second feeding line 108. From the drying inlet chamber 8 and the second feeding line 108, the gas stream is conducted through a plurality of adsorption conduits 101, which are present within the drying sector 102 at a given point of time. In the adsorption conduits which are present in the drying sector 102 at a given point of time, humidity is adsorbed, and hence the gas stream further dried.

Above a drying outlet chamber 9, which is arranged at the first end 111 of the adsorption chamber 11 and forms at least in part a first discharging line 109, the dried gas stream can be supplied to its destination via an outlet line 116.

The adsorption chamber 11 can be rotated by a chamber drive 12. According to FIG. 2, the adsorption chamber 11 rotates anticlockwise (cf. arrow 117) as seen from the first end 111. The flow direction of the gas is represented by arrows 118.

Figure 3:
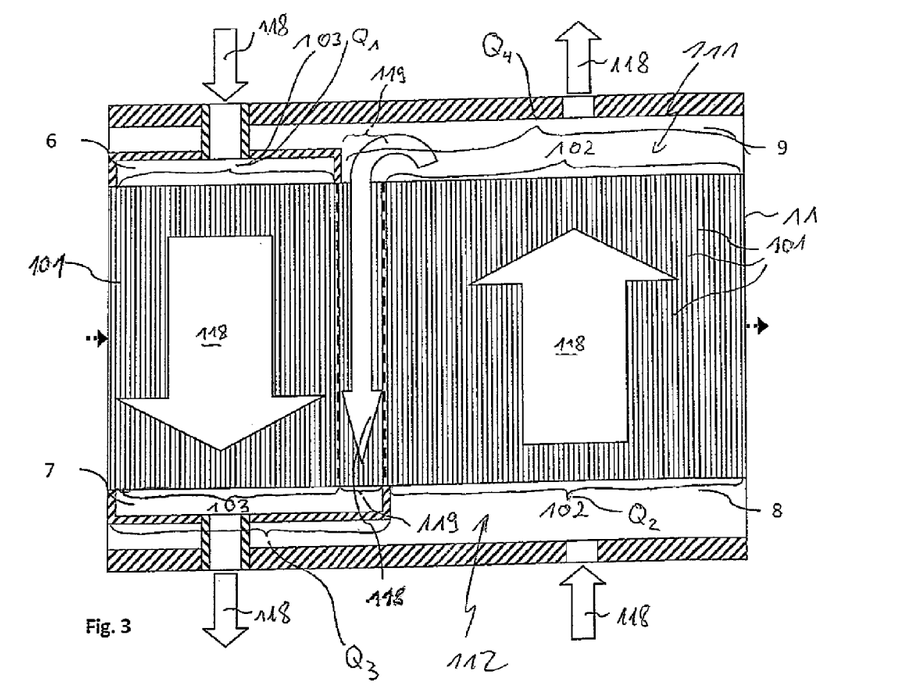
FIG. 3 is a schematic representation of an adsorption container used in an embodiment of the invention.

FIG. 3 shows a schematic representation of the adsorption container 5, in which a cooling sector 119 is formed next to the drying sector 102 and the regeneration sector 103. The direction of the gas stream is schematically shown by arrows 118. The schematic representation according to FIG. 3 corresponds to a developed view of the drum-like adsorption chamber 11 according to FIG. 2. In FIG. 3 the rotation of the adsorption chamber 11 corresponds to a movement from the left to the right. The heated gas stream flows from the regeneration inlet chamber 6 through the regeneration sector 103 to the regeneration outlet chamber 7. A cross-section Q3 of the regeneration outlet chamber 7 is larger than a cross-section Q1 of the regeneration inlet chamber 6. The cooling sector 119 is delimited at the first end 111 of the adsorption chamber 11 by the drying outlet chamber 9, and at the second end 112 by the regeneration outlet chamber 7. A cross-sectional area of the cooling sector 119 is in this case essentially determined by the difference Q3 minus Q1, or Q4 minus Q2. As a result, a part of the air dried in the drying sector 102 flows from the drying outlet chamber 9 to the regeneration outlet chamber 7 and cools the heated adsorption material before this is moved into the drying sector 102.

Apart from the cooling function, the cooling sector 119 according to FIG. 3 can also have the function to compensate for a difference between the operating volume flows of the input compressor 1 and the pressure-increasing device 18. When a volume flow, for instance, which is conducted from the input compressor 1 into the drying unit 16, decreases while a performance of the pressure-increasing device 18 remains constant, then this can be compensated for in that a correspondingly higher amount of compressed air flows through the cooling sector 119. In order to adjust the speed of the pressure-increasing device 18 so that drying can be ensured, it is not required to exactly determine the volume flow conducted from the input compressor 1 into the drying unit 16, since for a given volume flow from the input compressor 1 the drying is guaranteed over a larger speed range of the pressure-increasing device 18. Although this volume flow depends on a plurality of parameters, such as suction temperature and suction pressure of the input compressor 1, intake volume of the input compressor 1, suction temperature and suction pressure of the pressure-increasing device 18, a regulation of the speed of the pressure-increasing device 18 can yet be performed in a comparatively simple manner.

Figure 4:
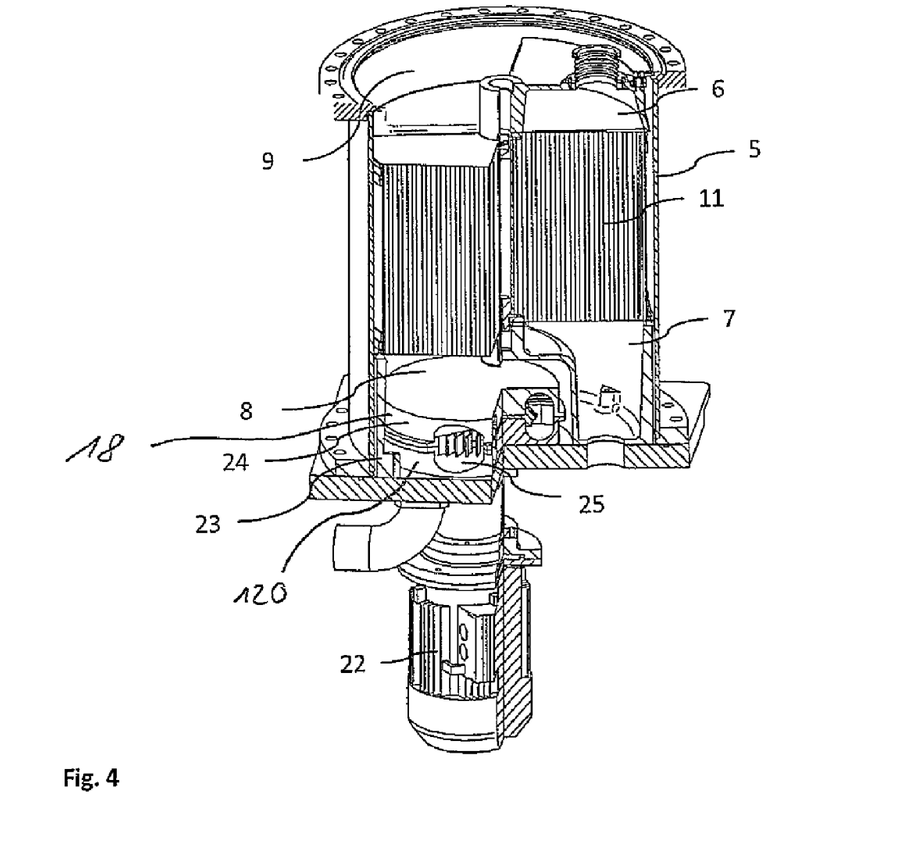
FIG. 4 is a perspective, partially sectioned view of adsorption drying apparatus according to a preferred embodiment of the invention.

FIG. 4 shows a cut-out of an adsorption drying apparatus in a preferred embodiment in perspective view. In this embodiment, the pressure-increasing device 18 comprises a side-channel compressor 24 arranged within the adsorption container 5 or drying inlet chamber 8. The compressed gas stream can be conducted directly into the drying inlet chamber 8 via a tangential outlet opening 25, preferably without further tubing. In particular, the side-channel compressor 24 can be integrated into a support 23 for the adsorption chamber 11. In this context, a compressor casing 120 designed for atmospheric pressure can be used.

A drive unit 22 drives the drive shaft 28 or the pressure-increasing device 18.

As an alternative, a radial compressor can be used, with the option to configure a corresponding compressor casing (e.g. a spiral casing), which is normally only designed for low overpressures, to be adequately pressure-resistant and/or to set an outlet of the compressor casing into communication with an inlet into the drying inlet chamber of the adsorption chamber.

Figure 5:
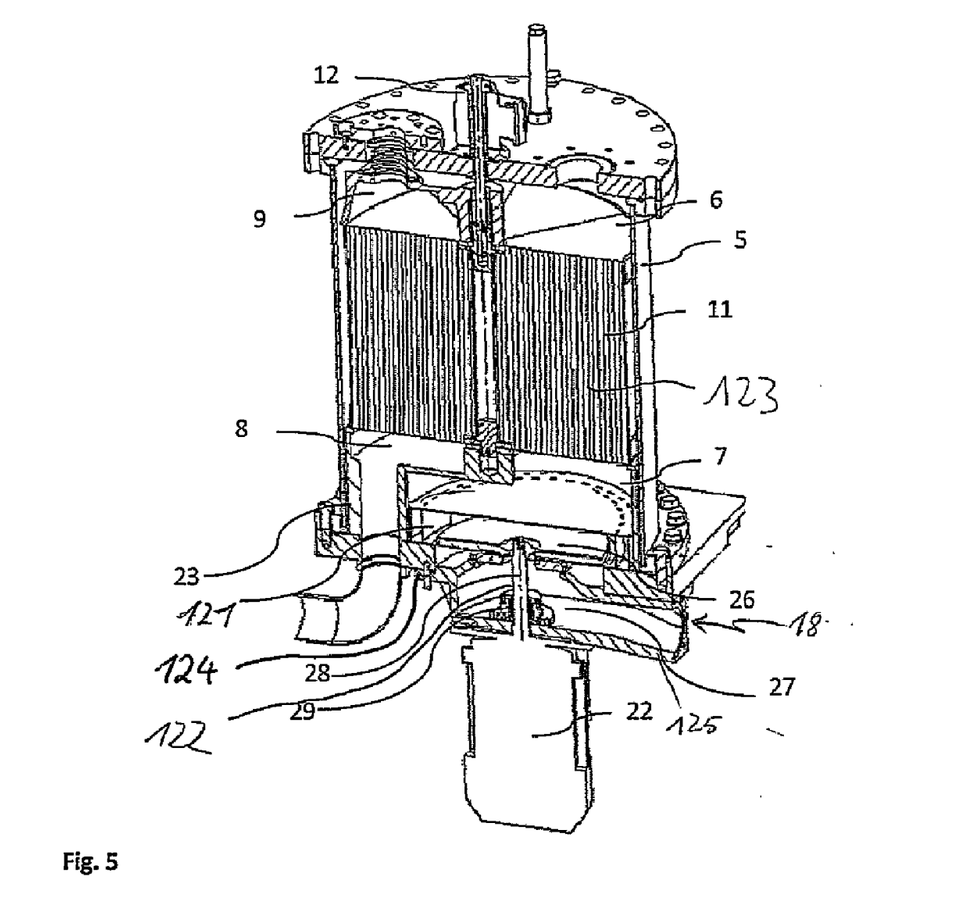
FIG. 5 is a perspective, longitudinal section view of an adsorption drying apparatus according to a further preferred embodiment of the invention.

FIG. 5 shows a cut-out of an adsorption drying apparatus according to a further preferred embodiment in a perspective view (partially cut). In this embodiment, a radial compressor wheel 26 is integrated into the adsorption container 5. A spiral casing is not formed, but a ring diffuser 121 is formed instead. The ring diffuser 121 can be formed at least in part by the support 23 or the drying inlet chamber 7 (such as per FIG. 5) and/or by providing suitable conducting means. Due to the ring diffuser 121 radial forces acting upon the drive shaft 28 are minimized, which has a positive effect on the bearing and feedthrough of the drive shaft 28. The drive shaft 28 is guided through a suction line 122 into which the gas to be dried is laterally fed through at least one inlet opening 27. A drive unit 22 drives the drive shaft 28 or the pressure-increasing device 18. The drive shaft 28 is sealed by a shaft seal 29.

The drive unit 22, together with the drive shaft 28 and a housing 125 for the inlet opening 27, can be mounted to the adsorption container 5 via a flange 124. According to a more general idea, the drive shaft 28 including the corresponding shaft seal 29 can be detached from the adsorption container 5, optionally together with the drive unit 22, respectively attached via an adequate fastening means. Thus, the shaft seal 29 is accessible even without the adsorption chamber 11 being removed, and can be replaced and/or cleaned. The maintenance of the adsorption drying apparatus is thus simplified.

It should be noted at this point that all of the parts described above, either taken alone or in any combination, in particular the details illustrated in the drawings are claimed as invention-relevant. Modifications hereof will be obvious to the person skilled in the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An adsorption drying apparatus, particularly for drying a compressed gas, comprising
   an adsorption chamber (11) having a plurality of adsorption conduits (101) containing an adsorption material (123),
   a first feeding line (106) and a first discharging line (109) disposed at a first end (111) of the adsorption chamber (11), and a second feeding line (108) and a second discharging line (107) disposed at a second end (112) of the adsorption chamber (11), wherein the adsorption chamber (11) is rotatable with respect to the feeding and discharging lines (106, 107, 108, 109),
   the adsorption conduits being fluidically connectable in temporal alternation with the first feeding line (106) and the second discharging line (109) or the first discharging line (107) and the second feeding line (108), so that a drying sector (102) and a regeneration sector (103) are defined, wherein the gas is dried in the drying sector (102), and the adsorption material (123) is regenerated in the regeneration sector (103),
   the first feeding line (106) being configured such that the gas to be dried is feedable to the regeneration sector (103) as a full flow,
   the second discharging line (107) being in communication with the second feeding line (108) and thus forming a connecting line in which a condenser is provided,
   a pressure increasing device (18) provided within the connecting line to increase pressure of the gas flowing from the second discharging line (107) to the second feeding line (108),
   a cooling stream optionally branched off at the first (111) or second end (112) of the adsorption chamber (11), so as to cool the adsorption chamber (11) within a cooling sector (119), and
   the regeneration sector (103) and the drying sector (102) being connected in cascade for a serial through-flow, such that a gas stream fed to the drying sector (102) essentially completely corresponds to a gas stream discharged from the regeneration sector (103), optionally including the a gas stream discharged from the cooling sector.

2. The adsorption drying apparatus according to claim 1, wherein the adsorption chamber (11) is supported to be rotatable within an adsorption container (5), and the feeding and discharging lines (106, 107, 108, 109) optionally form at least a part of the adsorption container.

3. The adsorption drying apparatus according to claim 2, wherein the pressure-increasing device (18) is provided at least in part within the adsorption container (5), optionally at least in part within a support (23) for the rotatable adsorption chamber (11).

4. The adsorption drying apparatus according to claim 1, wherein the pressure-increasing device (18) is a mechanical condenser, optionally selected from a compressor, a fan, a pump, a side-channel compressor (24), a turbo compressor, and a radial compressor.

5. The adsorption drying apparatus according to claim 1, further comprising an input compressor (1) for conducting the gas to be dried in a compressed state to the first feeding line (106),
   wherein the input compressor (1) optionally comprises a compressor condenser, optionally having an aftercooler (3) and a condensate separator (4), and
   wherein the compressor condenser forms at least in part the condenser provided in the connecting line.

6. The adsorption drying apparatus according to claim 1, wherein a first cross-sectional area Q1 of the first feeding line defining the regeneration sector is smaller than a third cross-sectional area Q3 of the second feeding line (107) adjacent to the adsorption chamber (11), a ratio of Q1/Q3 being in a range of 0.9 to 1.0, and/or a cross-sectional area Q2 of the second feeding line defining the drying sector (102) is smaller than a fourth cross-sectional area Q4 of the first discharging line (109) adjacent to the adsorption chamber (11), in order to cool the adsorption chamber (11) within the cooling sector (119).

7. The adsorption drying apparatus according to claim 4, wherein the pressure-increasing device (18) is a radial compressor having a ring diffuser (121).

8. The adsorption drying apparatus according to claim 1, wherein a drive shaft (28) for driving the pressure-increasing device (18) is guided at least in a line section of the connecting line.

9. The adsorption drying apparatus according to claim 8, wherein a drive unit (22) for driving the pressure-increasing device (18) is arranged outside of the pressure space, optionally outside of a compressor casing (120) and/or outside of the adsorption container (5).

10. The adsorption drying apparatus according to claim 9, wherein a shaft of a compressor wheel is unilaterally supported outside of the pressure space, optionally outside of the compressor casing (120) and/or outside of the adsorption container (5).

11. The adsorption drying apparatus according to claim 9, further comprising a seal optionally selected from a throttle slit seal, a labyrinth seal, a dry-running lip seal, a seal which is at least expandable, and/or a seal which seals at least during a standstill of the shaft, and/or a gas-lubricated or liquid-lubricated slip ring seal, wherein the seal is accessible from outside of the pressure space, optionally from outside of the compressor casing (120) and/or the adsorption container (5).

12. The adsorption drying apparatus according to claim 1, further comprising a controller for controlling a speed of the pressure-increasing device (18), optionally via frequency conversion.

13. The adsorption drying apparatus according to claim 12, wherein the controller is controlled via a signal from an input compressor, optionally via a speed of the input compressor and/or via a pressure within the input compressor and/or the adsorption drying apparatus.

14. An adsorption drying system comprising an adsorption drying apparatus according to claim 1, further comprising an input compressor (1) for compressing the gas to be dried,
wherein the compressed gas to be dried is conducted from the input compressor (1) to the first feeding line (106) as a full flow,
wherein the input compressor (1) optionally comprises a compressor condenser having an aftercooler (3) and a condensate separator (4), and
wherein the compressor condenser forms at least in part the condenser provided in the connecting line.

15. An adsorption drying method for drying a compressed gas, the method comprising the following steps a) to e):
a) providing an adsorption chamber (11) having a plurality of adsorption conduits (101);
b) conducting the gas to be dried in according to a full flow principle from a first end (111) of the adsorption chamber (11) to a second end (112) of the adsorption chamber (11) through a regeneration sector (103);
c) increasing a pressure of the gas after conducting it through the regeneration sector;
d) conducting the gas from the second end (112) to the first end (111) of the adsorption chamber (11) through a drying sector (102); and
e) rotating the adsorption chamber (11).

16. The adsorption drying method according to claim 15, wherein an amount of gas fed to the drying sector (102) in step d) corresponds to 105% to 115% of an amount of gas discharged from the regeneration sector (103) in step b).

17. The adsorption drying method according to claim 15, wherein between steps b) and d), liquid condensed from the gas by cooling is separated from the gas by condensate separation.

18. The adsorption drying method according to claim 15, wherein after step d) a portion of the gas, optionally 5-20%, is conducted from the first end to the second end of the adsorption chamber (11) through a cooling sector (119).

19. The adsorption drying method according to claim 15, wherein a drive unit (22) for increasing the pressure in step c) is operated at a variable speed, and wherein the speed is determined by evaluating at least one of the following parameters:
gas delivery amount of an input compressor for compressing the gas to be dried;
speed of the input compressor;
inlet pressure into a pressure-increasing device for step c);
inlet temperature into the pressure-increasing device;
suction pressure or ambient pressure of the input compressor;
suction temperature of the input compressor; and
differential pressure between a first end of the drying sector (102) and a second end of the regeneration sector (103).

20. The adsorption drying method according to claim 15, wherein the rotation in step e) is started only when a predefined temperature threshold of the gas and/or a component of an adsorption drying apparatus used is exceeded.

* * * * *